United States Patent
Viswanathan

(10) Patent No.: US 11,775,043 B2
(45) Date of Patent: Oct. 3, 2023

(54) POWER SAVING THROUGH DELAYED MESSAGE PROCESSING

(71) Applicant: Advanced Micro Devices, Inc., Santa Clara, CA (US)

(72) Inventor: Vidyashankar Viswanathan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/485,186

(22) Filed: Sep. 24, 2021

(65) Prior Publication Data

US 2023/0103054 A1     Mar. 30, 2023

(51) Int. Cl.
*G06F 1/32* (2019.01)
*G06F 1/3206* (2019.01)
*G06F 1/329* (2019.01)

(52) U.S. Cl.
CPC ............ *G06F 1/3206* (2013.01); *G06F 1/329* (2013.01)

(58) Field of Classification Search
CPC ................................ G06F 1/3206; G06F 1/329
See application file for complete search history.

(56) References Cited

U.S. PATENT DOCUMENTS

| 9,189,050 B1* | 11/2015 | Greenberg ............ G06F 1/3275 |
| 2009/0172683 A1 | 7/2009 | Lin et al. |
| 2009/0271796 A1 | 10/2009 | Kojima |
| 2017/0039144 A1 | 2/2017 | Wang et al. |
| 2018/0293114 A1 | 10/2018 | Mukherjee et al. |

FOREIGN PATENT DOCUMENTS

WO      2016-115000 A1    7/2016

* cited by examiner

Primary Examiner — Stefan Stoynov
(74) Attorney, Agent, or Firm — Volpe Koenig

(57) ABSTRACT

Systems and methods are disclosed for reducing the power consumption of a system. Techniques are described that queue a message, sent by a source engine of the system, in a queue of a destination engine of the system that is in a sleep mode. Then, a priority level associated with the queued message is determined. If the priority level is at a maximum level, the destination engine is brought into an active mode. If the priority level is at an intermediate level, the destination engine is brought into an active mode when a time, associated with the intermediate level, has elapsed. When the destination engine is brought into an active mode it processes all messages accumulated in its queue in an order determined by their associated priority levels.

20 Claims, 5 Drawing Sheets

100A

100B

200

300

400

POWER SAVING THROUGH DELAYED MESSAGE PROCESSING

BACKGROUND

To reduce the amount of power consumed by a system, processing units of the system that are not in an operational state are kept in either a clock-gated state or a retention state. In the former, the clocks of the nonoperational processing units are turned off, but the voltage is kept the same as in operational state. In the latter, the clocks of the nonoperational processing units are turned off and the voltage is lowered to a level that is just enough to preserve the data in the units' flip-flops and memory cells. However, processing units that are in an operational state (an active mode) often send messages across the system, including broadcast messages and other messages that specifically address those computing units that are in a sleep mode, requiring bringing the latter back into active mode. Awakening processing units that are in a sleep mode to process messages and generate appropriate responses increases the power consumption. This is especially so given that each time a processing unit is awakened it stays in this state for a while (i.e., hysteresis interval) before reverting to a sleep mode. To maintain low power consumption, techniques are needed to efficiently manage the distribution of messages among a system's processing units.

BRIEF DESCRIPTION OF THE DRAWINGS

A more detailed understanding can be achieved through the following description given by way of example in conjunction with the accompanying drawings wherein.

DETAILED DESCRIPTION

Figure 1A:
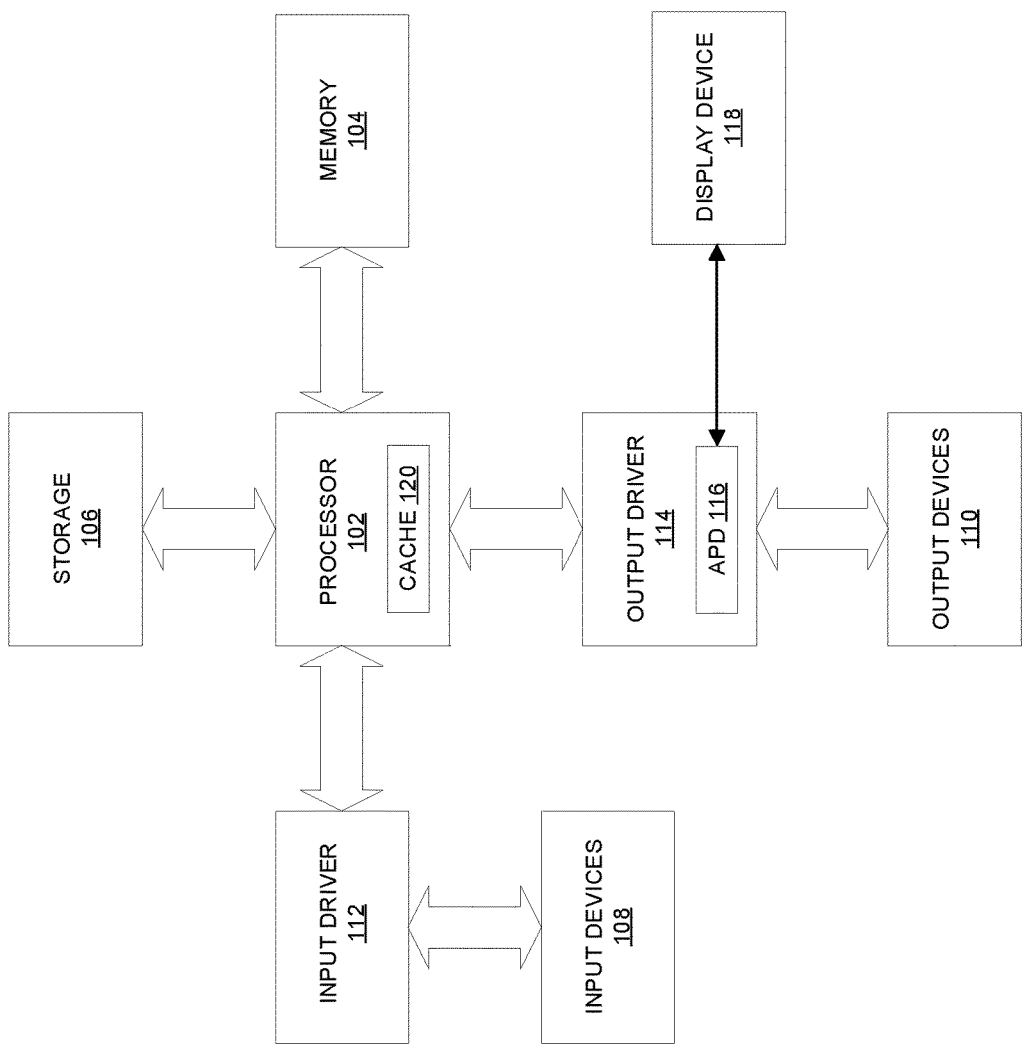
FIG. 1A is a block diagram of an example device, based on which one or more features of the disclosure can be implemented.

The present disclosure describes systems and methods for power saving through delayed processing of messages. Techniques are disclosed to limit the interruption of processing units' sleep mode by messages whose processing can be delayed. This can be achieved by maintaining a record that tracks system information from which the priority of a message can be derived by a message arbitrator. Messages that have been determined to have the highest priority level will be processed immediately by the processing unit they are sent to, even if that unit has to be brought into an active mode. Messages that have been determined to have an intermediate priority level will be processed when a time associated with the intermediate priority level has elapsed, at which time the processing unit they are sent to will be brought into an active mode if in a sleep mode. Messages that have been determined to have the lowest priority level will be queued and processed at a later time, for example, when the unit they are sent to is scheduled to execute a task (when brought into an active mode for an unrelated reason). Aspects disclosed herein, address both probes (i.e., messages between cache controllers) and any other messages between the processing units (e.g., configuration messages or messages originated from multi-threaded applications).

Aspects disclosed herein describe methods for reducing the power consumption of a system. Methods disclosed herein comprise queueing a message from a source engine of the system in a queue of a destination engine, wherein the destination engine is in a sleep mode; determining a priority level associated with the message; and in response to the priority level being a maximum level, bringing the destination engine into an active mode. In response to the priority level being at an intermediate level, methods disclosed herein comprise bringing the destination engine into an active mode upon expiration of a time period associated with the intermediate level. Further, methods disclosed herein comprise processing, by the destination engine, the message and other messages in the queue in an order determined by their associated priority levels when the destination engine is brought into an active mode.

Aspects disclosed herein also describe systems for reducing power consumption. Systems disclosed herein comprise at least one processor and memory storing instructions. The instructions, when executed by the at least one processor, cause systems disclosed herein to queue a message from a source engine of the system in a queue of a destination engine of the system, wherein the destination engine is in a sleep mode; determine a priority level associated with the message; and in response to the priority level being a maximum level, bring the destination engine into an active mode. The instructions also cause systems disclosed herein to, in response to the priority level being at an intermediate level, bring the destination engine into an active mode upon expiration of a time period associated with the intermediate level. The instructions further cause systems disclosed herein to process, by the destination engine, the message and other messages in the queue in an order determined by their associated priority levels when the destination engine is brought into an active mode.

Further, aspects disclosed herein describe a non-transitory computer-readable medium comprising instructions executable by at least one processor to perform methods for reducing the power consumption of a system. The methods comprise queueing a message from a source engine of the system in a queue of a destination engine of the system, wherein the destination engine is in a sleep mode; determining a priority level associated with the message; and in response to the priority level being a maximum level, bringing the destination engine into an active mode. Aspects are disclosed herein, wherein the message is a probe, initiated by a cache controller of the source engine; the determining the priority level associated with the message is based on a system-record, wherein the system-record stores information associated with the status of cache lines that are stored in caches of engines of the system; and the determined priority level is determined to be at a maximum level in response to the cache of the destination engine holding the most recent version of the cache line.

FIG. 1A is a block diagram of an example device 100A, based on which one or more features of the disclosure can be implemented. The device 100A can be a computer, a gaming device, a handheld device, a set-top box, a television, a mobile phone, a tablet computer, or any other computing device. The device 100A includes a processor 102, memory 104, storage 106, one or more input devices 108, and one or more output devices 110. The device 100A can also include one or more input drivers 112 and one or more output drivers 114. Any of the input drivers 112 can be embodied as hardware, a combination of hardware and software, or software. An input driver 112 can be used, for example, to control the operation of or to receive data from an input device 108. Similarly, any of the output drivers 114 can be embodied as hardware, a combination of hardware and software, or software. An output driver 114 can be used, for example, to control the operation of or to provide data to an output device 110. The device 100A can include a display device 118 which can be a physical display device or a simulated device that uses a remote display protocol to present output. Device 100A can include additional components not shown in FIG. 1A.

In various alternatives, the processor 102 includes a central processing unit (CPU), a graphics processing unit (GPU), other special-purpose accelerator units, and/or a combination thereof, that can be located on the same die, or on one or more (CPU, GPU, or accelerator) processor cores. The memory 104 can be located on the same die as the processor 102, or can be located separately from the processor 102. The memory 104 includes volatile or non-volatile memory, for example, random access memory (RAM), dynamic RAM, or a cache. As is generally known, a cache stores data determined by a cache manager as likely to be accessed often or in the near future by instructions executing on the processor 102. The cache 120 represents one or more caches that can be structured hierarchically, where caches higher in the cache hierarchy service misses from and receive evicted cache entries from caches lower in the cache hierarchy.

The storage 106 can be fixed or removable storage, including a hard disk drive, a solid-state drive, an optical disk, or a flash drive, for example. The input devices 108 can be, for example, a keyboard, a keypad, a touch screen, a touch pad, a detector, a microphone, an accelerometer, a gyroscope, a biometric scanner, or a network interface (e.g., a wireless local area network card for reception of IEEE 802 signals). The output devices 110 can be, for example, a display, a speaker, a printer, a haptic feedback device, one or more lights, an antenna, or a network interface (e.g., a wireless local area network card for transmission of IEEE 802 signals).

The input driver 112 and output driver 114 can include one or more hardware, software, and/or firmware components that can be configured to interface with the input devices 108 and the output devices 110, respectively. The input driver 112 communicates with the processor 102 and the input devices 108, and, typically, controls the transfer of input data from the input devices 108 to the processor 102. The output driver 114 communicates with the processor 102 and the output devices 110, and, typically, controls the transfer of output data from the processor 102 to the output devices 110. The device 100A can include an accelerated processing device ("APD") 116, either internal to the output driver 114 (as shown) or external to it. The APD 116 can be configured to accept compute commands from the processor 102, process data according to those commands, and provide the processed data. The APD 116 can also be configured to accept graphics rendering commands from the processor 102, process those commands, and provide output data to be rendered on the display device 118. The APD 116 can includes one or more parallel processing units configured to perform computations in accordance with a single-instruction-multiple-data ("SIMD") paradigm. In various alternatives, functionality described as being performed by the APD 116 is additionally or alternatively performed by other computing devices having similar capabilities that, for example, are not driven by a host processor (e.g., processor 102). In an aspect, any processing system that performs processing tasks in accordance with a SIMD paradigm may be configured to perform the functionality described herein. Alternatively, computing systems that do not perform processing tasks in accordance with a SIMD paradigm can perform the functionality described herein.

Figure 1B:
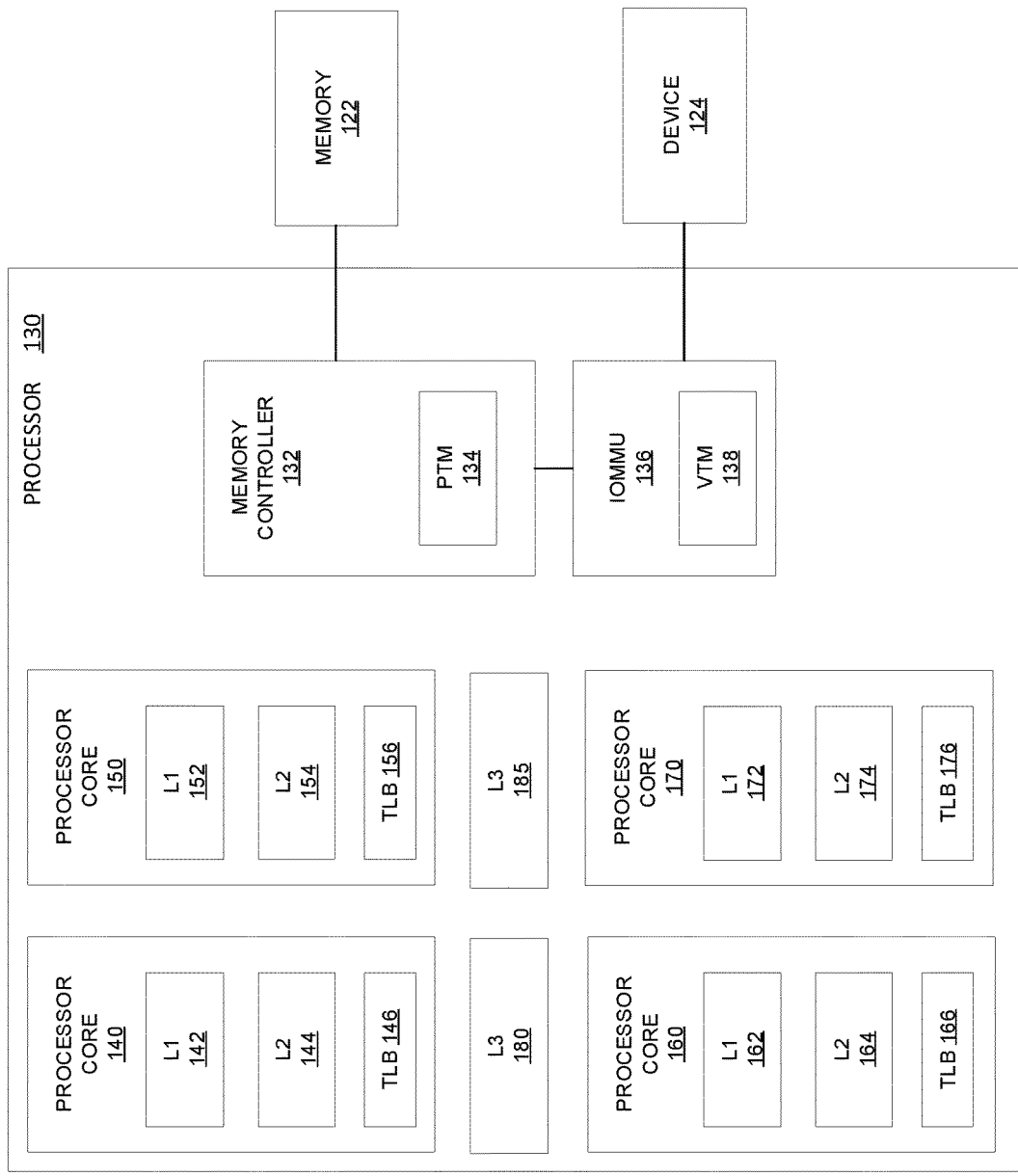
FIG. 1B is a block diagram of an example system, providing for cache access management, based on which one or more features of the disclosure can be implemented.

FIG. 1B is a block diagram of an example system, providing for cache access management, based on which one or more features of the disclosure can be implemented. The system 100B includes a processor 130 and memory 122. The system 100B can be incorporated in any of a variety of electronic devices, such as a server, a personal computer, a tablet, a set top box, or a gaming system. The processor 130 is generally configured to execute the instructions of an application (e.g., a computer program), to carry out the tasks defined by the application. The memory 122 facilitates the execution of the application's instructions by storing the instructions and the data the instructions operate on. The memory 122 can be, for example, random access memory (RAM), non-volatile memory such as flash memory or a hard disk drive (HDD), or a combination thereof. The system 100B also includes a device 124 that can be a physical input/output (I/O) device, such as a network interface card (NIC) or a host bus adapter (HBA).

The processor 130 can include multiple processor cores, for example, four processor cores 140, 150, 160, and 170. The processor cores 140, 150, 160, and 170 are processing units that can independently and concurrently execute instructions of one or more applications. In aspects, each of the processor cores 140, 150, 160, and 170 can include an instruction pipeline that fetches instructions, decodes the fetched instructions into corresponding operations, and, using the resources of the system 100B, executes the corresponding operations. Each of the processor cores 140, 150, 160, 170 can have low level caches dedicated to the processor core. For example, each processor core 140, 150, 160, 170, can have a level 1 (L1) cache 142, 152, 162, 172, and a level 2 (L2) cache 144, 154, 164, 174, respectively. Each processor core 140, 150, 160, 170 can also have a translation lookaside buffer (TLB) 146, 156, 166, 176, respectively. The processor 130 can further include two shared caches L3. One shared cache 180 is shared by one pair of core processors 140, 160 and the other shared cache 185 is shared by a second pair of core processors 150, 170.

The processor 130 can also include a memory controller 132 and an input/output memory management unit (IOMMU) 136. The IOMMU 136 can be used to connect a device 124 (e.g., the device of FIG. 1A) to the memory controller 132. In aspects, the IOMMU 136 communicates with devices 124 using a serial bus standard (e.g., Peripheral Component Interconnect Express (PCIe)). The memory controller 132 provides an interface for the device 124 to communicate with the memory 122 or with one or more of the caches, L1, L2, and L3 (not shown). The IOMMU 136 receives memory access requests (e.g., direct memory access requests, such as a cache injection memory access request) from the device 124 and controls provision of those requests to the memory 122 or to one of the caches via memory controller 132. The processor 130, for example, at the memory controller 132, includes a physical tag map (PTM) 134 to map a physical steering tag received from the IOMMU 136 into a physical resource targeted by an associated memory access request, such as a cache injection memory access request. In addition, the memory controller 132 can receive responses to memory access requests from the memory 122 or one of the caches and controls the provision of the responses to the device 124.

A cache injection memory access request can utilize steering tags to target processor resources, such as a lower level cache dedicated to a processor core or a shared cache. For example, the steering tag can target the L1 cache 152 or the L2 cache 154 that are accessible by processor core 150, or the L3 cache 185 that is accessible by processor cores 150 and 170. Accordingly, to facilitate efficient execution of memory access requests, the IOMMU 136 accesses a virtual tag map to translate virtual steering tags received in a memory access request to a physical steering tag mapped to a physical resource. In response to receiving a memory access request from the device 124, the IOMMU 136 identifies a virtual steering tag and translates the virtual steering tag with the virtual tag map (VTM) 138. The VTM 138 can be stored in system memory 122 and portions may be cached at the IOMMU 136. Alternatively, the VTM 138 can be cached at the IOMMU 136. The IOMMU 136 provides the memory access request and the physical steering tag to the memory controller 132. The memory controller 132 translates the physical steering tag to a physical resource, targeted by the memory access request, such as a lower-level cache targeted by a cache injection memory access request. In an example, the memory access request can target a low-level cache dedicated to a processor core. In such an example, an address associated with the request can be translated by a TLB, and the cache injection memory access then executed.

In some embodiments, the device 124 employs the memory controller 132 to access information in the memory 122 or in one of the caches through direct memory access (DMA) requests by initiating a memory access request containing a virtual steering tag and a virtual address sent to the IOMMU 136. The IOMMU 136 can perform steering tag remapping between a virtual steering tag and a physical steering tag and address translation between virtual addresses and physical addresses in the memory 122 or one of the caches. The steering tag remapping process and the address translation process can be independent functions of the IOMMU and can be performed concurrently. For example, the device 124 can generate cache injection memory access requests, including write requests to store data in the cache associated with a processor executing a virtual machine that is in need of the data provided by the device 124. Each memory access request can include a virtual steering tag mapped through an associated physical steering tag to a cache (e.g., L3 cache 180 or 185; L1 cache 142, 152, 162, or 172; L2 cache 144, 154, 164, or 174) and a memory address indicating a location in the cache targeted by the cache injection memory access request. In response to a write request, the cache stores the data of the write request at the location corresponding to the memory address of the write request.

Figure 2:
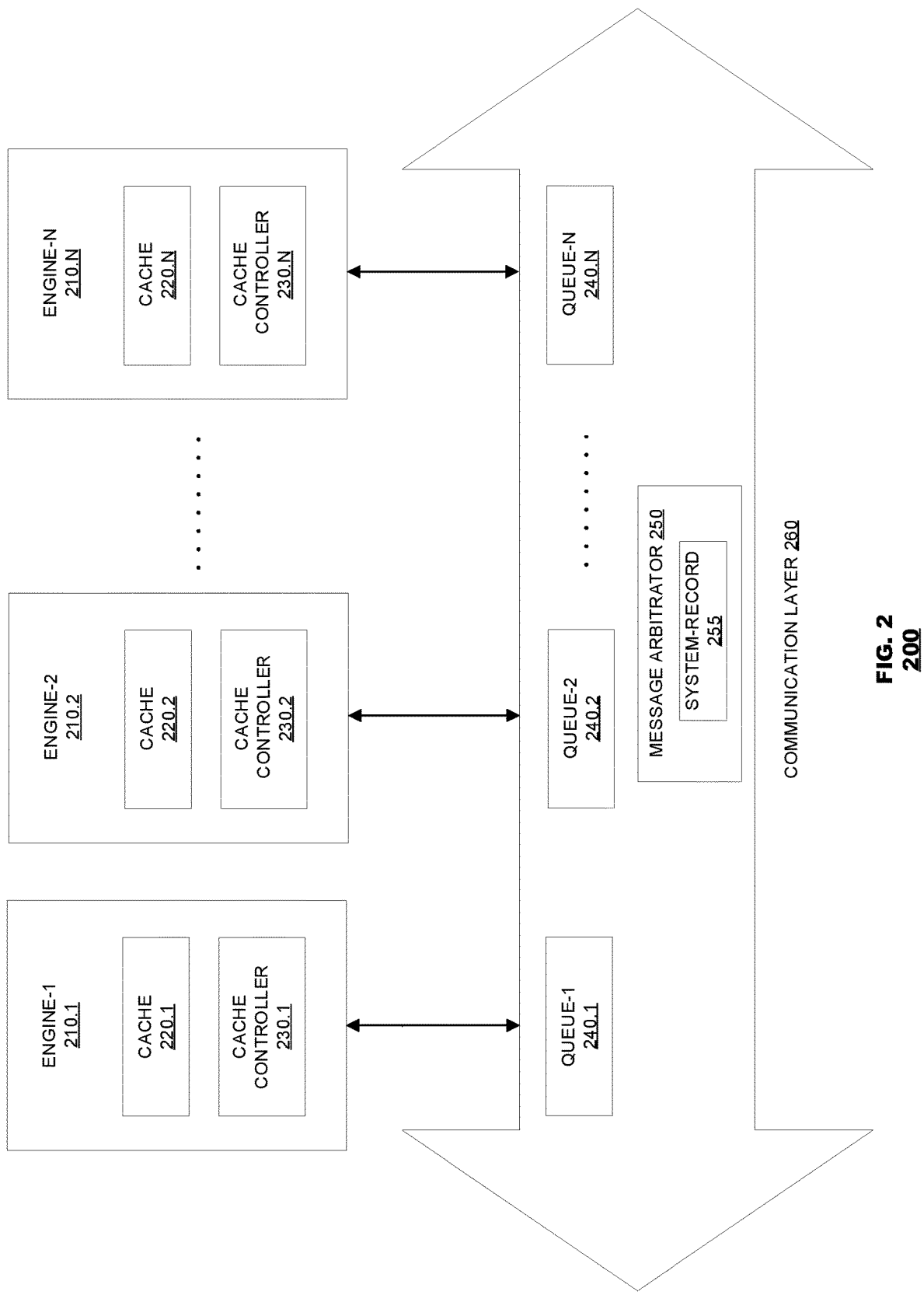
FIG. 2 is a block diagram of an example system for reducing power consumption, based on which one or more features of the disclosure can be implemented.

FIG. 2 is a block diagram of an example system 200 for reducing power consumption based on which one or more features of the disclosure can be implemented. This system 200 demonstrates techniques for reducing power consumption with respect to messages associated with system cache management. The system 200 includes engines 210.1-210.N, each represents a processing unit, including, for example, one or more CPUs, GPUs, DSPs, encoders/decoders, or any other customized computing units. The engines 210.1-210.N, or a subset thereof, can be local to each other (e.g., residing on the same chip or on the same circuit) or can be remote to each other. Each engine, for example, 210.1, can include a cache 220.1 (representative herein of one or more caches) and a respective cache controller 230.1. A communication layer 260 communicatively connects the engines 210.1-210.N or their components, for example, 230.1-230.N. The communication layer 260 can be part of a network, utilizing any communication protocol (e.g., network-on-a-chip such as AMD's fabric interconnect). In an aspect, the communication layer 260 can embody queues 240.1-240.N, associated with respective engines 210.1-210.N, and a message arbitrator 250. In another aspect, the queues 240.1-240.N and the message arbitrator 250 can be external to the communication layer 260, embodied in other system components. In both aspects, the queues 240.1-240.N and the message arbitrator 250 operate in a domain that is always operational (that is, always powered on while the system is running).

In an aspect, the message arbitrator 250 and queues 240.1-N can be used to handle all types of messages. In another aspect, separate arbitrators and queues can be used, each handling a different type of messages (e.g., probes, configuration messages, or messages originated from multi-threaded applications). The message arbitrator 250 can maintain a system-record 255 based on which messages' priorities can be derived, as explained in detail below. The message arbitrator 250 can be made configurable (via register programming) to allow flexibility in adjusting the way in which priorities are determined based on the system's or specific processing units' requirements.

The queues 240.1-240.N, as disclosed herein, can be used to queue probes generated by the engines' cache controllers 230.1-230.N. Similarly, these queues 240.1-240.N, or other dedicated queues, can be used to queue probes generated by the engines' TLB controllers (not shown in FIG. 2). For example, the message arbitrator 250 can maintain data in the system-record 255 that track virtual-to-physical address translation mappings, stored in the TLBs of respective engines 210.1-N. Thus, TLB controllers of the engines 210.1-N can send probe messages to invalidate TLB entries that have become stale (e.g., due to the mappings being changed or removed), similar, for example, to the way the cache controllers 230.1-N operate with respect to their respective caches 220.1-N. Hence, techniques described herein with respect to the cache controllers 230.1-N and their respective caches 220.1-N are extendable to TLB controllers and their respective TLBs.

In an aspect, the queues 240.1-240.N can be used to queue messages such as probes generated by the engines' cache controllers 230.1-230.N. Typically, several caches in the system 200 may store copies of the same cache line (i.e., a data block previously fetched from memory, e.g., 104 or 122). Conventionally, when, for example, engine-1 210.1 wishes to write into or read from a line in its cache 220.1, its cache controller 230.1 has to verify that that line, if residing in the other caches 220.2-220.N, was not already modified by their respective engines 210.2-210.N. Since engine-1's cache controller 230.1 does not know which, if any, of the other caches 220.2-220.N holds that line, it has to send an inquiry message (or a probe) to all the other cache controllers 230.2-230.N. Thus, in a system 200 with a large number of engines, engine-1's cache controller 230.1 has to send a broadcast message to all the other cache controllers in the system. The sending of the broadcast message is an operation that consume considerable amount of power. As it is likely that a large number of the engines' caches do not hold that line, engaging these engines with the broadcast message present a waste in power consumption and execution time.

Instead of broadcasting messages, as described above, a cache controller can send messages (or probes) only to those engines that hold the line. This can be accomplished by maintaining a system-record 255 (e.g., maintained by the message arbitrator 250) that tracks the lines stored in the caches 230.1-230.N of the system 200. For example, the system-record 255 can store the following information for each line: the caches that hold the line and when the line has been last modified by a respective cache (or the identity of the cache that most recently modified the line).

Hence, in reference to the example above, instead of broadcasting to all the engines 210.2-210.N in the system 200, engine-1's cache controller 230.1 can consult with the message arbitrator 250 to find out which engines hold that line, and, then, send a message to only those engines. For example, engine-1's cache controller 230.1 can send a message to the engine that most recently modified that line to get the content of that most up-to-date line. Additionally, engine-1's cache controller 230.1 can send all the engines that hold that line a message (invalidation-probe) informing them that the line has been modified by engine-1 so that they can invalidate their copy of that line. The message arbitrator 250 can then update the system-record 255 to indicate that now cache 220.1 holds the most recent version of that line. Hence, maintaining a system-record 255, as described above, allows for a more efficient system operation and system power consumption, as the number of messages can be reduced significantly.

Generally, system power consumption can be kept at a low level by putting engines that are not active in a sleep mode. An engine can be either in an active mode (normal operation at a certain clock frequency) or in a sleep mode (not operational, in a clock-gated state or a retention state). When an engine in the system 200 probes other engines, as described above, it may awaken engines that are in a sleep mode. In such a case, the awakened engine, after responding to the probe, will stay in an active mode for a while (during a hysteresis interval) before moving back into a sleep mode. Often, a probe sent to an engine that is in a sleep mode does not require immediate attention (non-urgent probe) by the engine, and, thus, such a probe could be processed at a later time (e.g., when the engine enters an active mode). Hence, awakening an engine to respond to non-urgent probes (for which the response can be taken care of later when the engine will be brought into an active mode) and the hysteresis interval that follows the processing of the non-urgent probes contribute to additional power consumption that could be avoided, as explained in detail below.

As mentioned above, engines of a system 200 that are not active are kept in a sleep mode to save power. When probes are sent to these engines, unless the probes require immediate response by the engines, the probes can be queued in the engines' respective queues and be processed only when the engines are brought back into an active mode. For example, when engine-1 210.1 has to read a line from (or write a line into) its cache 220.1, it has to first find out which caches of the caches 220.2-220.N in the system 200 hold a version of that line and which one has the most up-to-date version. Thus, in an aspect, engine-1's cache controller 230.1 can consult the message arbitrator 250 to inquire which engines should be probed and in what manner.

Based on information stored in the system-record 255, the message arbitrator 250 can identify those caches in the system that hold that line, and, further, identify the cache that updated that line most recently. For example, the message arbitrator 250 can identify four caches that hold that line, for example, 210.1-210.4. In a case where engine-1's cache 220.1 holds the most recent version of the line, engines 210.2-210.4 have to receive a probe that informs them that their versions of that line are invalid, namely an invalidation-probe. In a case where another engine's version of that line is the most recent one, for example, engine-2 210.2, in addition to informing engines 210.2-210.4 that their versions of that line are invalid, engine-1's cache controller 230.1 has to probe engine-2 with a request to receive that most recent version of the line from engine-2's cache 220.2. Such a request, namely an update-probe, has to be handled immediately by engine-2 to allow engine-1 to read from (or write into) the most recent version of that line. Engines 210.3-210.4 only need to receive an invalidation-probe, and, if these engines are in a sleep mode, there is no urgent need to awaken them at this stage. Instead, their respective invalidation-probes can be queued in their respective queues 240.3-240.4 to be processed when those engines enter an active mode. Accordingly, in an aspect, messages that do not require immediate response or processing by the receiving respective engines, for example, as determined by the message arbitrator 250 based on information stored in the system-record 255, can be queued in the respective engines' queues.

When an engine enters an active mode, it processes all the probes accumulated in its queue before attending to other tasks. In the example above, engine-2, having the most recent version of the line has to respond immediately to an update-probe sent to it from engine-1. Thus, when awakened by engine-1, engine-2 processes the update-probe together with other (non-urgent) probes that were accumulated in its queue 240.2. The other engines 210.3-210.4 will process the non-urgent probes (including the invalidation-probe sent by engine-1 in the above example) in their respective queues 240.3-240.4 at a later time when entering into an active mode (e.g., when being scheduled by the operating system's scheduler to run a task) or when their respective queues 240.3-240.4 are full. Thus, the larger the system's 200 queues 240.1-240.N are when a queue is filled, the more messages will be processed by the awakened engine associated with the queue, and so less power will be consumed per a queued message (as the number of times an engine is awaken per a message is reduced).

Queuing probes that do not require immediate attention in queues 240.1-240.N of respective engines 210.1-210.N can lead to a significant saving in system power consumption. Otherwise, not only that an engine is awakened to respond to a probe the processing of which can be delayed to a time when the engine becomes active in the normal course of system operation, but also each time an engine is awakened to handle a probe it stays in active mode during a hysteresis interval before returning back to a sleep mode. In aspects disclosed herein, the message arbitrator 250 can be instrumental in saving power with respect to other type of messages too (not related to caches' control), as explained in detail below.

Figure 3:
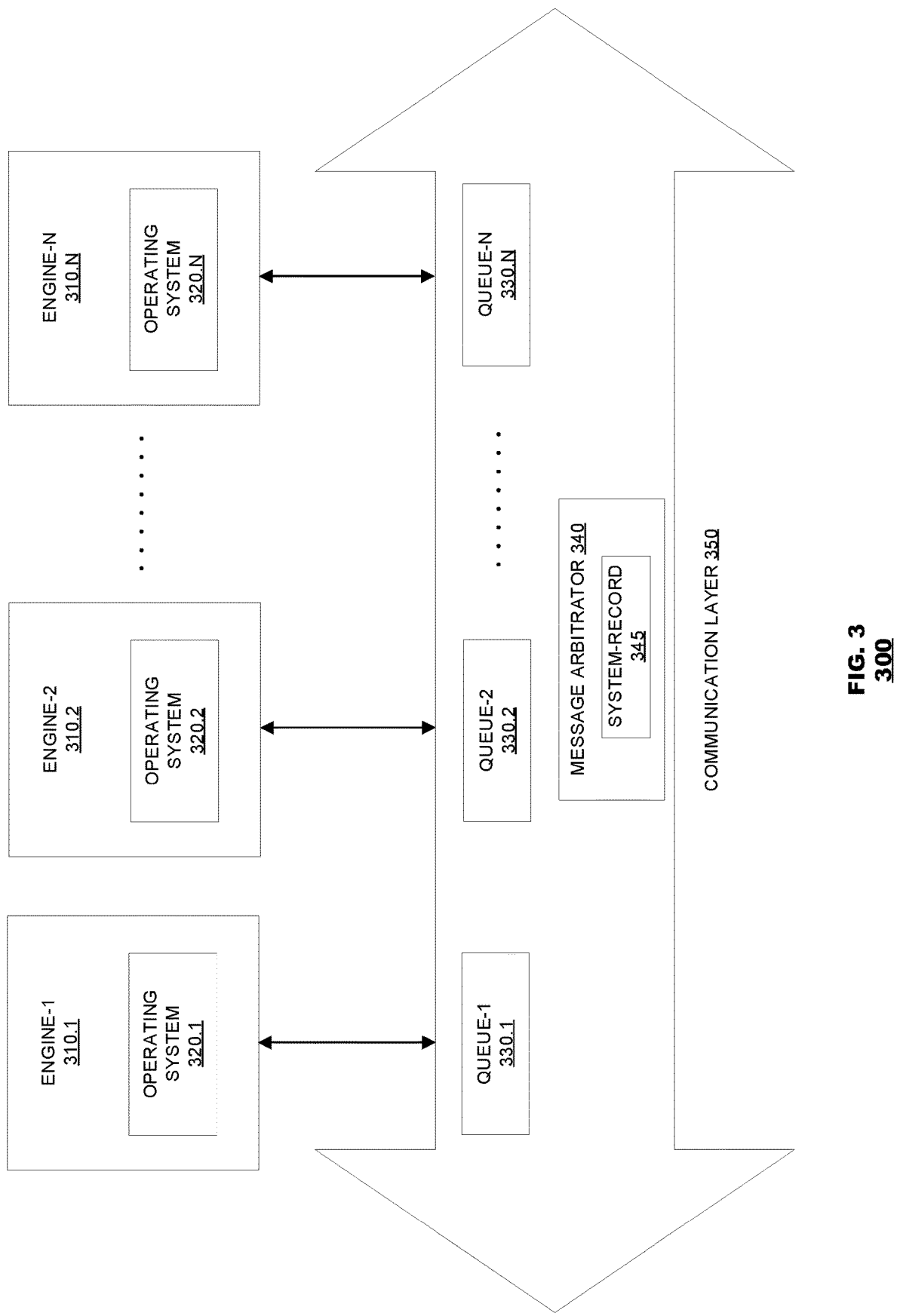
FIG. 3 is a block diagram of another example system for reducing power consumption, based on which one or more features of the disclosure can be implemented.

FIG. 3 is a block diagram of another example system 300 for reducing power consumption 300, based on which one or more features of the disclosure can be implemented. This system 300 demonstrates techniques for reducing power consumption with respect to any type of messages sent by the system's 300 processing units. The system 300 includes engines 310.1-310.N, each representing a processing unit, including, for example, one or more CPUs, GPUs, DSPs, encoders/decoders, or any other customized computing units. The engines 310.1-310.N, or a subset thereof, can be local to each other (e.g., residing on the same chip or on the same circuit) or can be remote to each other. Each engine, for example, 310.1, can be operated by an operating system, for example, 320.1. A communication layer 350 communicatively connects the engines 310.1-310.N or their components, for example, 320.1-320.N. The communication layer 350 can be part of a network, utilizing any communication protocol (e.g., network-on-a-chip such as AMD's fabric interconnect). In an aspect, the communication layer 350 can embody queues 330.1-330.N, associated with respective engines 310.1-310.N, and a message arbitrator 340. In another aspect, the queues 330.1-330.N and the message arbitrator 340 can be external to the communication layer 350, embodied in other system components. In both aspects, the queues 330.1-330.N and the message arbitrator 340 operate in a domain that is always operational (that is, always on demand).

In an aspect, the queues 330.1-330.N can be used to queue messages generated by the engines' operating systems 320.1-320.N. These messages can originate from software modules that run on the various engines 310.1-310.N and/or can be configuration messages sent by the engines' operating system 320.1-320.N. For example, a message may be issued by a latency-sensitive software module for which immediate response is required or a message may be issued by the operating system (a configuration message) for which an immediate response is or is not necessary. In a case in which a message does not require immediate attention by the destination engine the message can be queued in its queue. As described above with respect to system 200, queuing non-urgent messages can prevent unnecessarily awakening of destination engines, and, thereby, can save power. In an aspect, when an engine's operating system has to send a message to a destination engine it can queue the message in the destination engine's queue. Then, the engine's operating system can consult with the message arbitrator 340 to determine whether the processing of the message can be delayed or whether the message requires immediate attention of the destination engine. In the former, the destination engine can process the message (and all the other messages in its queue) once it has been scheduled by its operating system to perform a task. In the latter, the destination engine will be immediately awakened into an active mode to process the queued message that requires immediate attention (and all the other messages in its queue).

In an aspect, the message arbitrator 340 can maintain a system-record 345 that stores information from which a priority of a message can be derived. The system-record 345 can record, for each message type, a priority level that can be indexed by the destination engine and the source engine. For example, a certain configuration message type (e.g., a request to move to a secured mode), if issued by engine-1 310.1 to engine-2 310.2, can have one level of priority associated with it, while, if issued by engine-2 310.2 to engine-1 310.1, can have another level of priority associated with it. A priority level of a message type can be associated with a time value, where a zero time value can represent the highest priority (an urgent message) and a non-zero time value can represent an intermediate priority. A non-zero time value can be interpreted as the maximum time a message may spend in the queue before being processed. A non-zero time value that is above a pre-determined time value can represent the lowest priority, meaning no time limitation for a message to be kept in the queue, in which case the message will be processed when the queue's corresponding engine will be brought into an active mode.

Accordingly, in an aspect, engines 310.1-310.N of system 300 can register their preferences, for example, during an initialization phase, with the message arbitrator 340, based on which the system-record 345 can be built. For example, engine-2 can register its preference (to be indexed in the system-record) to receive a certain message type when sent by engine-1 at a certain priority level. When engine-1 sends that message type to engine-2, it can inquire with the message arbitrator 340 as to that message type's priority-level and send the message accordingly, as follows. First, engine-1 will queue the message in engine-2's queue. Then, if the message priority level is the highest, engine-2 will be awakened to immediately process the message. If the priority level is the lowest, the message will be processed when engine-2 will be brought into an active mode. And, if the message priority level is intermediate, it will be allowed to wait in the queue for a maximum amount of time (associated with the intermediate priority level) after which engine-2 will be awakened (if not already brought into an active mode beforehand) to process the message. Notice that in such a scenario, the priority level is determined according to the destination engine's preference. However, in an aspect, the priority level of a message type can be determined according to the source engine's preference. In another aspect, the priority level of a message type can be a combination of the source engine's and destination engine's preferences. For example, engine-1 can modify (cast) the priority level (that was indexed in the system-record 345 according to engine-2's preference) by its own priority level and send the message to engine-2 according to the casted priority level. Such casting can be useful if, for example, the message priority should be modified because of a certain real-time system event or an application requirement associated with or known to engine-1 (the source engine).

Hence, messages that do not require immediate response or processing by their respective engines, as determined by the message arbitrator 340 based on the system-record, can be queued in the respective engines' queues. When an engine enters an active mode, it processes all the messages accumulated in its queue before attending to other tasks. As mentioned above, a priority level can be associated with a time value: a zero-time value (representing a maximum or a highest priority level), above a pre-determined time value (representing a minimum or a lowest priority level), and any time value in between that can determine the maximum time a message can be in the queue (representing an intermediate priority level). Thus, messages in a queue that are associated with an intermediate priority level can have attached to them timers that measure the time each message spent in the queue. If a measured time reaches the maximum time for the message (as determined by the message's intermediate priority level), the corresponding engine is awakened so it can tend to the processing of that message as well as the other messages in its queue.

As mentioned above, queuing messages that do not require immediate attention in queues 330.1-330.N of respective engines 310.1-310.N can lead to a significant saving in system power consumption. Since each time an engine is awakened to respond to a message, after processing that message and the other messages in its queue it stays in operational mode during a hysteresis interval before returning back to a sleep mode. Therefore, the lower the frequency in which an engine is awaken to handle messages in its queue is, the higher the saving in power consumption i.

Figure 4:
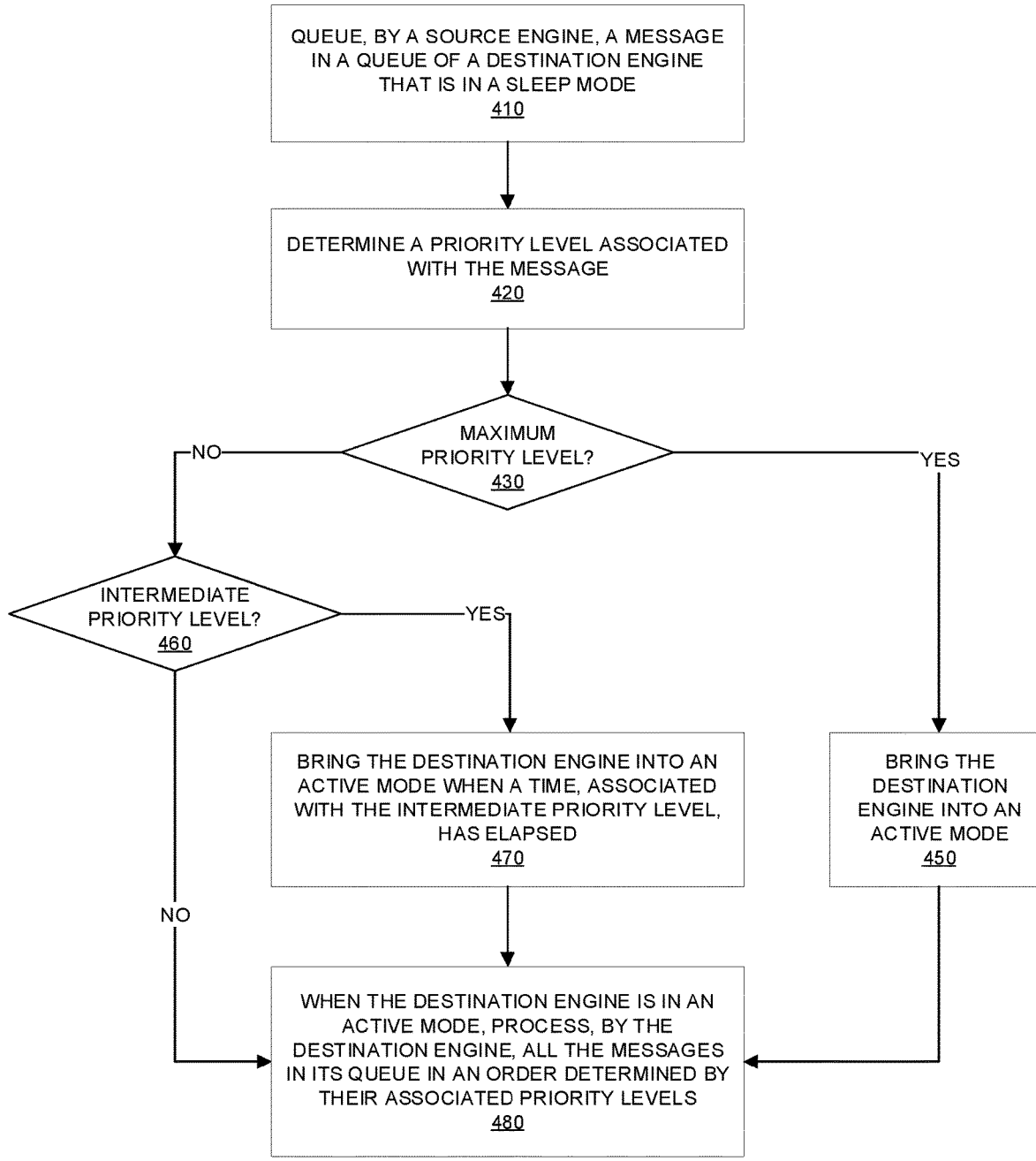
FIG. 4 is a flow chart of an example method for reducing the power consumption of a system, based on which one or more features of the disclosure can be implemented.

FIG. 4 is a flow chart of an example method 400 for reducing the power consumption of a system, based on which one or more features of the disclosure can be implemented. In step 410 a source engine can queue a message in a queue of a destination engine that is in a sleep mode. Then, a priority level associated with the queued message can be determined in step 420. If the priority level is at a maximum (or highest) priority level 430, in step 450 the destination engine can be brought into an active mode. If the priority level is at an intermediate priority level 460, in step 470 the destination engine can be brought into an active mode when a time, associated with the intermediate priority level, has elapsed. Otherwise, if the priority level is not at an intermediate level 460 (that is, at a minimum (or lowest) priority level), the queued message is processed at a later time, when the destination engine is brought into an active mode to perform an unrelated task. When the destination engine is brought into an active mode, in step 480, it can process the queued message and other messages already in its queue in an order determined by their associated priority levels or in the order in which the messages were received in the queue. In an aspect, the order in which the queued messages are processed can be made configurable. Note that, in step 480, the destination engine can be brought into an active mode because: it was awakened to process a message with maximum priority level (step 450), it was awakened due to the expiration of a timer associated with a message in its queue (step 470), it was awakened by its scheduler to perform an unrelated task.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing the power consumption of a system, comprising:
    queueing a cache probe from a source engine of the system in a queue of a destination engine, wherein the destination engine is in a sleep mode;
    determining a priority level associated with the cache probe; and
    in response to the priority level being a maximum level, bringing the destination engine into an active mode.

2. The method of claim 1, further comprising:
    in response to the priority level being at an intermediate level, bringing the destination engine into an active mode upon expiration of a time period associated with the intermediate level.

3. The method of claim 1, further comprising:
    processing, by the destination engine, the cache probe and other cache probes in the queue in an order determined by their associated priority levels when the destination engine is brought into an active mode.

4. The method of claim 1, wherein the priority level is determined based on at least one of a type of the cache probe, an identity of the source engine, an identity of the destination engine, or a combination thereof.

5. The method of claim 1, wherein the queueing of the cache probe is initiated by a cache controller of the source engine.

6. The method of claim 5, wherein the determining the priority level associated with the cache probe is based on a system-record, wherein the system-record stores information associated with a status of cache lines that are stored in caches of engines of the system.

7. The method of claim 6, wherein the determined priority level is determined to be at a maximum level in response to a cache of the destination engine holding a most recent version of the cache line.

8. The method of claim 1, wherein the destination engine is one of a plurality of destination engines.

9. The method of claim 8, further comprising bringing a subset of the plurality of destination engines to the active mode in response to the priority level being the maximum level.

10. A system for reducing power consumption, comprising:
    at least one processor; and
    memory storing instructions that, when executed by the at least one processor, cause the system to:
        queue a cache probe from a source engine of the system in a queue of a destination engine of the system, wherein the destination engine is in a sleep mode;
        determine a priority level associated with the cache probe; and
        in response to the priority level being a maximum level, bring the destination engine into an active mode.

11. The system of claim 10, wherein the instructions further cause the system to:
    in response to the priority level being at an intermediate level, bring the destination engine into an active mode upon expiration of a time period associated with the intermediate level.

12. The system of claim 10, wherein the instructions further cause the system to:

process, by the destination engine, the cache probe and other cache probes in the queue in an order determined by their associated priority levels when the destination engine is brought into an active mode.

13. The system of claim 10, wherein the priority level is determined based on at least one of a type of the cache probe, an identity of the source engine, an identity of the destination engine, or a combination thereof.

14. The system of claim 10, wherein the queueing of the cache probe is initiated by a cache controller of the source engine.

15. The system of claim 14, wherein the determining the priority level associated with the cache probe is based on a system-record, wherein the system-record stores information associated with a status of cache lines that are stored in caches of engines of the system.

16. The system of claim 15, wherein the determined priority level is determined to be at a maximum level in response to a cache of the destination engine holding a most recent version of the cache line.

17. The system of claim 10, wherein the destination engine is one of a plurality of destination engines.

18. The system of claim 17, wherein the instructions further cause the system to bring a subset of the plurality of destination engines to the active mode in response to the priority level being the maximum level.

19. A non-transitory computer-readable medium comprising instructions executable by at least one processor to perform a method for reducing the power consumption of a system, the method comprising:
    queueing a cache probe from a source engine of the system in a queue of a destination engine, wherein the destination engine is in a sleep mode;
    determining a priority level associated with the cache probe; and
    in response to the priority level being a maximum level, bringing the destination engine into an active mode.

20. The non-transitory computer-readable medium of claim 19, wherein:
    the queueing of the cache probe is initiated by a cache controller of the source engine,
    the determining the priority level associated with the cache probe is based on a system-record, wherein the system-record stores information associated with the status of cache lines that are stored in caches of engines of the system, and
    the determined priority level is determined to be at a maximum level in response to the cache of the destination engine holding the most recent version of the cache line.

* * * * *